United States Patent
Koudouridis et al.

(10) Patent No.: US 10,674,404 B2
(45) Date of Patent: Jun. 2, 2020

(54) NETWORK NODE AND METHOD THEREOF

(71) Applicant: Huawei Technologies Co., Ltd., Shenzhen (CN)

(72) Inventors: George Koudouridis, Kista (SE); Pablo Soldati, Kista (SE); Henrik Lundqvist, Kista (SE); Johan Christer Qvarfordt, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 16/112,260

(22) Filed: Aug. 24, 2018

(65) Prior Publication Data

US 2019/0053100 A1    Feb. 14, 2019

Related U.S. Application Data

(63) Continuation of application No. PCT/EP2016/054114, filed on Feb. 26, 2016.

(51) Int. Cl.
*H04W 72/04*    (2009.01)
*H04W 28/08*    (2009.01)
(Continued)

(52) U.S. Cl.
CPC ........ *H04W 28/085* (2013.01); *H04B 17/318* (2015.01); *H04B 17/336* (2015.01);
(Continued)

(58) Field of Classification Search
CPC ............... H04W 28/085; H04W 24/10; H04W 28/0289; H04W 36/22; H04W 72/0486;
(Continued)

(56) References Cited

U.S. PATENT DOCUMENTS

| | | | | |
|---|---|---|---|---|
| 8,290,503 | B2 * | 10/2012 | Sadek ................ | H04W 72/082 455/452.1 |
| 9,148,818 | B2 * | 9/2015 | Yue ........................ | H04L 5/001 |
| 9,380,594 | B1 * | 6/2016 | Malmirchegini ..... | H04W 72/10 |
| 9,883,492 | B2 * | 1/2018 | Koudouridis ..... | H04W 72/0413 |

(Continued)

FOREIGN PATENT DOCUMENTS

| | | | | |
|---|---|---|---|---|
| CN | 103945538 A | * | 7/2014 | .......... H04L 1/0025 |
| CN | 103945538 A | | 7/2014 | |

(Continued)

OTHER PUBLICATIONS

"3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 12)," 3GPP TS 36.300 V12.5.0,3rd Generation Partnership Project, Valbonne, France (Mar. 2015).

(Continued)

*Primary Examiner* — Edan Orgad
*Assistant Examiner* — Vanneilian Lalchinthang
(74) *Attorney, Agent, or Firm* — Leydig, Voit & Mayer, Ltd.

(57) ABSTRACT

A network node for a wireless communication system is provided. The first network node comprises a processor configured to obtain channel quality information for a user device, obtain a load information for first radio access resources, determine a first association of the first radio access resources to the user device based on the channel quality information and the load information, the first association being valid during a first validity time period, compute first user data rates for the first radio access resources based on the channel quality information, determine a utilization of the first radio access resources based on the first association and the first user data rates. A corresponding method, a wireless communication system, a computer program, and a computer program product are also provided.

20 Claims, 5 Drawing Sheets

(51) Int. Cl.
*H04L 5/00* (2006.01)
*H04L 1/00* (2006.01)
*H04B 17/318* (2015.01)
*H04B 17/336* (2015.01)
*H04W 24/10* (2009.01)
*H04W 28/02* (2009.01)
*H04W 28/06* (2009.01)
*H04W 36/22* (2009.01)
*H04W 72/08* (2009.01)

(52) U.S. Cl.
CPC .......... *H04L 1/0002* (2013.01); *H04L 5/0053* (2013.01); *H04W 24/10* (2013.01); *H04W 28/0289* (2013.01); *H04W 28/06* (2013.01); *H04W 36/22* (2013.01); *H04W 72/0486* (2013.01); *H04W 72/085* (2013.01)

(58) Field of Classification Search
CPC . H04W 72/085; H04B 17/318; H04B 17/336; H04L 5/0053; H04L 1/0002
USPC ........................................................ 370/329
See application file for complete search history.

(56) References Cited

U.S. PATENT DOCUMENTS

| | | | |
|---|---|---|---|
| 2009/0161545 A1* | 6/2009 | Ho ................. | H04L 47/225 370/235 |
| 2012/0289170 A1* | 11/2012 | Li ................. | H04W 72/085 455/73 |
| 2013/0083755 A1* | 4/2013 | Berberana Fernandez-Murias ..... | H04W 72/08 370/329 |
| 2013/0163541 A1* | 6/2013 | Roh ................. | H04W 72/04 370/329 |
| 2013/0170480 A1* | 7/2013 | Novak ............. | H04W 74/0833 370/337 |
| 2015/0110056 A1* | 4/2015 | Wang ................. | H04W 72/005 370/329 |
| 2016/0337930 A1* | 11/2016 | Agarwal ............. | H04W 28/08 |
| 2017/0127402 A1* | 5/2017 | Kweon .............. | H04W 72/085 |

FOREIGN PATENT DOCUMENTS

| | | |
|---|---|---|
| WO | 2010088586 A2 | 8/2010 |
| WO | 2011099906 A1 | 8/2011 |
| WO | 2014194927 A1 | 12/2014 |

OTHER PUBLICATIONS

"3rd Generation Partnership Project;Technical Specification Group Radio Access Network;Evolved Universal Terrestrial Radio Access (E-UTRA); Further advancements for E-UTRA physical layer aspects(Release 9)," 3GPP TR 36.814 V9.0.0, 3rd Generation Partnership Project, Valbonne, France (Mar. 2010).

Koudouridis et al., "A quantitative analysis of the throughput gains and the energy efficiency of multi-radio transmission diversity in dense access networks," Telecommunication System (2015).

"3rd Generation Partnership Project;Technical Specification Group Radio Access Network;Coordinated multi-point operation for LTE physical layer aspects(Release 11)," 3GPP TR 36.819 V11.2.0, 3rd Generation Partnership Project, Valbonne, France (Sep. 2013).

Soldati et al., "Distributed Spectrum Access in Dense 5g Networks," 2015 IEEE International Symposium on Information Theory Proceedings, Hong Kong, China, Institute of Electrical and Electronics Engineers, New York, New York (Sep. 2015).

Kela et al., "Borderless Mobility in 5G Outdoor Ultra-Dense Networks", IEEE Access, vol. 3, Institute of Electrical and Electronics Engineers, New York, New York (Sep. 2015).

"3rd Generation Partnership Project;Technical Specification Group Radio Access Network;Evolved Universal Terrestrial Radio Access (E-UTRA); Carrier aggregation enhancements; User Equipment (UE) and Base Station (BS) radio transmission and reception (Release 11)," 3GPP TR 36.823 V11.0.1, 3rd Generation Partnership Project, Valbonne, France (Sep. 2013).

Dimou et al.,"Generic Link Layer: A Solution for Multi-Radio Transmission Diversity in Communication Networks Beyond 3G," Vehicular Technology Conference, 2005 IEEE 62nd, vol. 3. IEEE, Institute of Electrical and Electronics Engineers, New York, New York(Sep. 2005).

* cited by examiner

NETWORK NODE AND METHOD THEREOF

CROSS-REFERENCE TO RELATED APPLICATIONS

This application is a continuation of International Application No. PCT/EP2016/054114, filed on Feb. 26, 2016, the disclosure of which is hereby incorporated by reference in its entirety.

TECHNICAL FIELD

The embodiments of the invention relate to a network node for a wireless communication system. Furthermore, the embodiments of the invention also relate to a corresponding method, a wireless communication system, a computer program, and a computer program product.

BACKGROUND

Due to more powerful mobile user equipment, such as smart-phones and tablets, and the development of real-time video streaming Internet applications, mobile data traffic is expected to increase almost exponentially within the next decade. These trends pose high-demands on the capacity of future wireless networks and one viable way to meet these demands is by means of denser network deployments. In this context, heterogeneous and small cell networks (HSNs), which are characterized by a large number of access nodes (ANs) with different transmit power levels, frequency resources and radio coverage areas, have been considered in industrial standards, such as the LTE/LTE-Advanced standards of the 3rd Generation Partnership Project (3GPP) standards organisation.

HSN deployments will not only yield higher signal-to-interference-plus-noise ratio (SINR) and average data rates but also potentially reduce the networks' energy consumption since it implies an increase in the number of radio access (RA) resources per unit area at a shorter, on average, distance from the users. The term RA resource may refer to a carrier or a channel which is a piece of continuous spectrum of frequencies of a certain bandwidth provided by an access node for users' transmissions. An RA resource may be implemented by one or more antennas and/or antenna elements belonging to one remote radio head (RRH) and/or access node (AN). Each RA resource may be shared by multiple users and it is expected that the average user rates are even higher if users' devices have the ability to be associated with and simultaneously utilize a multiplicity of RA resources.

In traditional cellular radio systems, mobile users access the network by first searching synchronization signals transmitted by network nodes and measuring the strength of the associated reference signals, and then by transmitting an access request to the network node that provides the strongest received signal. A mobile user already connected to the network, on the other hand, is typically required to monitor the signal strength of multiple network nodes so as to facilitate handover from a serving network node to another network node when the signal strength of the latter becomes better than the signal strength of the former. Either procedure aims at assuring that the mobile user is always associated with/connected to the network node that provides the best signal strength. This, however does not guarantee the best usage of the network resources nor assures the best service to the users.

For instance, assuming a network node n applies an equal share of the available time-frequency radio resources of an RA to the served mobile users, the theoretically achievable average user data rate for a user i over RA resource j, $r_{i,j}$, can be modelled through the Shannon bound as:

$$r_{i,j} = \frac{W_j}{L_j} \log_2(1 + SINR_{i,j}),$$

where $W_j$ and $L_j$ are the frequency spectrum bandwidth and the traffic load (expressed as the average number of active users served) of RA resource j, while $SINR_{i,j}$ is the signal to noise plus interference ratio experienced by user i from RA resource j. It is clear from this equation that a RA resource j' with lower traffic load $L_{j'} < L_j$ can provide a higher average data throughput despite a lower signal strength, i.e., when $SINR_{i,j'} < SINR_{i,j}$.

The related art 3GPP LTE-A Rel.-12 system has partially addressed this issue by investigating mechanisms for balancing the traffic load among network nodes. The purpose of load shifting/balancing is to improve the system performance by changing the traffic load distribution over network nodes either to obtain a more evenly distributed traffic load across the network nodes or to concentrate the traffic into fewer network nodes so as to mitigate inter-cell interference. To that end, it was proposed to achieve load balancing/shifting via cell association based on:

The strongest reference signal received power (RSRP) in conjunction with a cell association bias;
The strongest reference signal received quality (RSRQ) in conjunction with a cell association bias or threshold;
Long-term SINR UE measurements in conjunction with a cell association bias;
A function of UE measurements (RSRP, RSRQ, and long-term SINR) and of network-side information, e.g. cell resource utilizations;
RSRQ or SINR UE measurements within shortened measurement interval.

With regards to load balancing and in the context of heterogeneous networks (HetNets), which typically consist of a macro layer and an underlay small-cell layer, it has been recognized that to increase significantly the capacity of the HetNet, mobile users need to be steered toward more lightly loaded network layers (e.g., pico and femtocells), even if they offer a lower SINR than the macro-cell. To that end, the user to cell association is determined by optimizing a function of the long-term user rates, i.e., by solving a network utility maximization problem over all the SINRs and cell loads. This approach has been further developed to include the powering on and off of cells in the context of multi-RAT ultra-dense networks (UDN). Therein, distributing traffic load among cells leads to the activation of more cells, which in non-uniform and low traffic loads show significant user rate improvements for the users at the cell edges.

Also in the case of more recent user-centric proposals for 5G networks, users are simultaneously associated with one or more antennas and/or antenna elements belonging to one or more remote radio heads (RRH) and/or access nodes (ANs) based on:

Uplink mobility beacons sent by the mobile users (in idle or eco mode i.e., the radio or the user plane are not active, but an ID is assigned and tracked by the network);

CSI beacons sent by the mobile users (in active mode, e.g., active radio operation with context in the network node).

In this first conventional solution, the antenna elements and the ANs constitute an RA resource which a mobile user is associated with and served by. In other words, different groups of antenna elements associated with one or more ANs may constitute one RA resource.

In a second conventional solution enhanced frequency-domain inter-cell interference coordination (ICIC) can be used in LTE when two component carriers (i.e., frequency spectrum bands) are available at a network node. In order to reduce the inter-cell interference, the utilization/activation of component carriers should be coordinated among network nodes. To this end, the available component carriers are categorized into secondary cells (Scells) and primary cell (Pcell). Then, in a first step inter-cell interference is reduced by selecting a Pcell for different geographical areas, similarly to frequency reuse schemes in cellular systems. In a second step, the secondary Scell is activated at a network node for a specific mobile user when high data throughput is requested. One criterion to add an additional Scell is, for instance, when the RSRQ of the Scell is higher than a certain threshold. LTE releases 10 and 11 have introduced several advanced features to reduce interference between macro-layer and pico-layer, such as enhanced ICIC (eICIC), which is particularly suitable for HetNets.

Load balancing and ICIC mechanisms are used for the long time-scale operations based on average performance values. Average performance values are suitable for adapting to changes of the traffic load, however, they filter out fast channel variations, which are associated with diversity gains. For short time-scales, benefiting from diversity requires dynamic selection of RA resources among a multiplicity of RA resources for the transmission of a user's data.

In a third conventional solution, the dynamic selection and transmission of a user's data via an RA resource is performed by means of different multi-radio transmission diversity (MRTD) schemes. MRTD encompasses coordinated multi-point (CoMP), which allow joint transmissions from multiple ANs. Depending on the MRTD and the ICIC/spectrum usage schemes, short time-scale operations may further imply discontinuous transmission (DTX) for a subset or RAs. An extension of this conventional solution is to provide users with flexible access to radio spectrum bands by increased integration of different carriers and different radio access technologies (RATs). The integration of carriers belonging to the same RAT is performed at PHY-layer by means of carrier aggregation (CA). CA is used to increase the bandwidth, and thereby increase the user rate. In 3GPP LTE-A, each aggregated carrier, which is referred to as a component carrier (CC), can have a bandwidth of 1.4, 3, 5, 10, 15 or 20 MHz and a maximum of five component carriers can be aggregated, hence the maximum aggregated bandwidth is 100 MHz. Various forms of CA exist including intra-band, inter-band, and inter-node CA aiming at improving flexibility to the utilisation of the carriers. Assuming devices that support multiple CCs, multi-CC utilization can be performed in terms of dual connectivity. Dual connectivity utilizes simultaneous connections to both the macro-tier and the pico-tier for the transmission of the user data, either simultaneously or in a time division multiplexing manner (TDM).

In the described conventional solutions, a mobile user assists the network in RA resource association, handover and load balancing procedures by sending uplink beacons or by providing feedback related to the received signal strength from multiple network nodes. This, however, is insufficient to assure that the mobile user is connected or handed over to a network node with the potential to offer the required service.

A drawback of the first conventional solution is that it aims at equalizing the load among network nodes without taking into account how the load could be distributed in relation to the available RA resources at each network node.

A drawback of the second conventional solution is that it is designed for two component carriers and assumes a static allocation of the primary component carrier for network nodes (i.e., the Pcell), thus requiring a careful cell planning at the deployment stage. In practice, more than two component carriers, may be made available at the network nodes and their utilization should not be constrained. An additional drawback of the second prior art is that, in the context of HSN, activating more cells or component carriers results in an undesirable increase of the inter-cell interference and thus in a reduction of the spectral efficiency. Interference mitigation and RA resource coordinated utilisation methods that optimise for both the long time-scale and the short-time scale operations are missing. In addition, the RA resource association criteria used to distribute the users among network nodes only accounts for signal quality measures at the mobile users, which is not per se an indication of the service (e.g., data throughput) that can be offered on average to the mobile user by a network node (e.g., due to the traffic load it is expected to serve). In some cases it would be more beneficial to distribute them among multiple RA resources and benefit potentially from both more time frequency resources and diversity gains. A more integrated method would require that that the traffic demands of the user as well as the RA resource and user density are taken into account.

A drawback of the third conventional solutions is that this solution doesn't per se solve the problem of user association with multiple RA resources. The solution only facilitates simultaneous utilisation of a multiplicity of RA resources assuming that the associated RA resources are known. In particular, in very dense networks where users may have access and served by multiple RA resources, solutions of the third prior art does not address distribution of load and proportional fairness in the long run.

SUMMARY

An objective of embodiments of the invention is to provide a solution which mitigates or solves the drawbacks and problems of conventional solutions.

Another objective of this embodiments of the invention is to provide resource allocation for flexible and adaptive radio access resources utilization at network nodes of wireless communication systems.

The above objectives and further objectives are achieved by the subject matter of the independent claims. Further advantageous implementation forms of the embodiments of the invention are defined by the dependent claims.

According to a first aspect of the embodiment of the invention, the above mentioned and other objectives are achieved with a first network node for a wireless communication system, the first network node comprising:
a processor configured to:
  obtain channel quality information for a user device;
  obtain a load information for first radio access resources;
  determine a first association of the first radio access resources to the user device based on the channel quality information and the load information, the first association being valid during a first validity time period;

compute first user data rates for the first radio access resources based on the channel quality information;

determine a utilization of the first radio access resources based on the first association and the first user data rates, wherein the utilization of the first radio access resources indicates radio access resource to be used for transmission or reception of data to or from the user device.

The first network node according to the first aspect provides a number of advantages over conventional solutions. One such advantage is that the determination of the first association and the utilization is separated which reduces the complexity. This allows the first network node to optimize the solution with reasonable processing requirement. Further, by using the user data rates to determine the utilization allows a straightforward comparison between different radio access technologies and therefore supports radio resource allocation to multiple different types of radio resources to user devices.

In a first possible implementation form of a network node according to the first aspect, the processor is configured to:

obtain new channel quality information for the user device during the first validity time period;

compute updated first user data rates for the first radio access resources based on the new channel quality information;

determine an updated utilization of the first radio access resources based on the first association and the updated first user data rates.

This implementation form allows the utilization to be updated on faster time scale than the association, which allows the utilization to be calculated for the limited set of radio access resources determined by the association. Therefore, the complexity of determining the utilization is reduced.

In a second possible implementation form of a network node according to the first possible implementation form or to the first aspect as such, the processor is configured to:

obtain new load information;

obtain measured user data rates during the first validity time period;

determine an updated first association based on the new load information and the measured user data rates.

The association is according to this implementation form updated based on new load information and measured user data rates during the whole association period (i.e. the first validity time period) and in some embodiments also at earlier association periods. This load information and measured user data rates are changing with slower dynamics than the channel quality information used for the utilization determination and is therefore suitable for the association determination.

In a third possible implementation form of a network node according to the second possible implementation form, the processor is configured to:

determine an updated first validity time period for the updated first association based on any of the obtained channel quality information and the measured user data rates.

This implementation form allows the first network node to adapt the length of the first validity time period, e.g. to the mobility of the user devices at different times of the day. The changes in the channel quality information and the measured user data rates would reveal whether the user device patterns have changed so that an updated first validity time period would be favorable.

In a fourth possible implementation form of a network node according to any of the preceding possible implementation forms or to the first aspect as such, further comprising a transceiver configured to:

transmit the first association to at least one second network node.

This implementation form allows cooperation between different network nodes where each network node informs neighbor network nodes about which user devices they can serve. Therefore, a distributed solution to the allocation of the first radio access resources can be supported.

In a fifth possible implementation form of a network node according to the fourth possible implementation form, the transceiver is configured to:

transmit a first configuration parameter to the at least one second network node, the first configuration parameter indicating the first validity time period.

This implementation form allows the network nodes to determine the validity time periods of associations between user devices and other network nodes. In particular, the network nodes can use the first parameter to determine when the associations need to be updated in order to have a well-defined connectivity for all user devices.

In a sixth possible implementation form of a network node according to the fifth possible implementation form, the first configuration parameter further indicates utilization policy information for the first association.

This implementation form allows the network nodes to communicate which utilization policies should be used for user devices, e.g. policies for how many radio access resources a user device should be associated to simultaneously, and how many radio access resources a user device should be utilizing simultaneously. Further, a threshold describing the decision point on the utilization strategy, such as MRTD strategy (Switched or Parallel), be aligned between two network nodes in a distributed solution so that the same strategy is used in both network nodes.

In a seventh possible implementation form of a network node according to any of the fourth to the sixth possible implementation form, the transceiver is configured to:

transmit the first user data rates to the second network node.

This implementation form allows the second network node to determine its utilization based on both the user data rates in its own radio access resources and on the user data rates in other network nodes. The second network node can therefore determine a utilization that allows the user device to utilize the radio access resources that gives higher expected data rates. It can also be used to determine if a user device should be utilizing more than one radio access resource at the same time. Moreover, the user data rates may contain relative data rate information that allows the network nodes to determine a utilization where the user devices are utilizing the radio access resources that are most efficient from a network performance point of view.

In an eight possible implementation form of a network node according to any of the fourth to the seventh possible implementation form, the transceiver is configured to:

transmit the utilization of the first available radio access resources to the user device.

This implementation form allows the user device to adapt its data transmission and reception to the utilization determined by the network node.

In a ninth possible implementation form of a network node according to any of the fourth to the eighth possible implementation form, the transceiver is configured to:

transmit or receive data to or from the at least one user device according to the utilization of the first radio access resources.

This implementation form allows the association and utilization determined by the first network node to be used for data transmission and reception to and from the user device.

In a tenth possible implementation form of a network node according to any of the fourth to the ninth possible implementation form, the transceiver is configured to:

receive a second association of second radio access resources to the at least one user device from the at least one second network node;

wherein the processor is configured to:

determine the utilization of the first radio access resources further based on the second association.

This implementation form allows cooperation between different network nodes where each network node receives an association from neighbor network nodes about which user device(s) they can serve. Therefore, a distributed solution to the allocation of the first radio access resources can be supported.

In an eleventh possible implementation form of a network node according to the tenth possible implementation form, the transceiver is configured to:

receive second user data rates for the second radio access resources;

wherein the processor is configured to:

determine the utilization of the first radio access resources further based on the second user data rates.

This implementation form allows the first network node to determine its utilization based on both the user data rates in its own radio access resources and on the user data rates in other network nodes. The first network node can therefore in one embodiment determine a utilization that allows the user device to utilize the radio access resources that gives higher expected data rates. It can also be used to determine if a user device should be utilizing more than one radio access resource at the same time. Moreover, the user data rates may contain relative data rate information that allows the network nodes to determine a utilization where the user device is utilizing the radio access resources that are most efficient from a network performance point of view.

In a twelfth possible implementation form of a network node according to the tenth or eleventh possible implementation form, the transceiver is configured to:

receive a second configuration parameter for the second association, the second configuration parameter indicating a second validity time period for the second association;

determine the utilization of the first radio access resources further based on the second validity time period.

In one further implementation form, the first network node may use the shortest validity time period indicated by the received configuration parameters from other network nodes and its own determined validity time period as the validity time period to use for a first association. This would align the length of the association time periods across the network nodes in the network, which has the advantage that the computational complexity would be limited.

In one further implementation form, the validity time period for the first association may be user device or network node specific, i.e. the network node could use different validity times for the associations between different user devices and radio resources. This has the advantage that the validity times for the first association can be adapted to the mobility and traffic dynamics of each user device or the user devices connected to a network node.

In a thirteenth possible implementation form of a network node according to the twelfth possible implementation form, the second configuration parameter further indicates utilization policy information for the second association.

This implementation form allows the first and second network nodes to communicate which utilization policies should be used for user devices, e.g. policies for how many radio access resources a user device should be associated to simultaneously, and how many radio access resources a user device should be utilizing simultaneously. Further, a threshold describing the decision point on the utilization strategy, such as MRTD strategy (Switched or Parallel), can be aligned between two network nodes in a distributed solution so that the same strategy is used in both network nodes.

According to a second aspect of the embodiment of the invention, the above mentioned and other objectives are achieved with a method for a wireless communication system, the method comprising:

obtaining channel quality information for a user device;

obtaining load information for first radio access resources;

determining a first association of the first radio access resources to the user device based on the channel quality information and the load information, the first association being valid during a first validity time period;

computing first user data rates for the first radio access resources based on the channel quality information;

determining a utilization of the first radio access resources based on the first association and the first user data rates, wherein the utilization of the first radio access resources indicates radio access resource to be used for transmission or reception of data to or from the user device.

In a first possible implementation form of a method according to the second aspect, the method comprises:

obtaining new channel quality information for the user device during the first validity time period;

computing updated first user data rates for the first radio access resources based on the new channel quality information;

determining an updated utilization of the first radio access resources based on the first association and the updated first user data rates.

In a second possible implementation form of a method according to the first possible implementation form or to the second aspect as such, the method comprises:

obtaining new load information;

obtaining measured user data rates during the first validity time period;

determining an updated first association based on the new load information and the measured user data rates.

In a third possible implementation form of a method according to the second possible implementation form, the method further comprises:

determining an updated first validity time period for the updated first association based on any of the obtained channel quality information and the measured user data rates.

In a fourth possible implementation form of a method according to any of the preceding possible implementation forms or to the second aspect as such, the method further comprises:

transmitting the first association to at least one second network node.

In a fifth possible implementation form of a method according to the fourth possible implementation form, the method further comprises:

transmitting a first configuration parameter to the at least one second network node, the first configuration parameter indicating the first validity time period.

In a sixth possible implementation form of a method according to the fifth possible implementation form, the first configuration parameter further indicates utilization policy information for the first association.

In a seventh possible implementation form of a method according to any of the fourth to the sixth possible implementation form, the method comprises:

transmitting the first user data rates to the second network node.

In an eight possible implementation form of a method according to any of the fourth to the seventh possible implementation form, the method comprises:

transmitting the utilization of the first available radio access resources to the user device.

In a ninth possible implementation form of a method according to any of the fourth to the eighth possible implementation form, the method comprises:

transmitting or receive data to or from the at least one user device according to the utilization of the first radio access resources.

In a tenth possible implementation form of a method according to any of the fourth to the ninth possible implementation form, the method comprises:

receiving a second association of second radio access resources to the at least one user device from the at least one second network node;

determining the utilization of the first radio access resources further based on the second association.

In an eleventh possible implementation form of a method according to the tenth possible implementation form, the method comprises:

receiving second user data rates for the second radio access resources;

wherein the processor is configured to:

determining the utilization of the first radio access resources further based on the second user data rates.

In a twelfth possible implementation form of a method according to the tenth or eleventh possible implementation form, the method comprises:

receiving a second configuration parameter for the second association, the second configuration parameter indicating a second validity time period for the second association;

determining the utilization of the first radio access resources further based on the second validity time period.

In a thirteenth possible implementation form of a method according to the twelfth possible implementation form, the second configuration parameter further indicates utilization policy information for the second association.

The advantages of the methods according to second aspect are the same as the corresponding first network node according to the first aspect.

Embodiments of the invention also relates to a computer program, characterized in code means, which when run by processing means causes said processing means to execute any method according to the embodiments of the invention. Further, the embodiments of the invention also relate to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION

Figure 1:
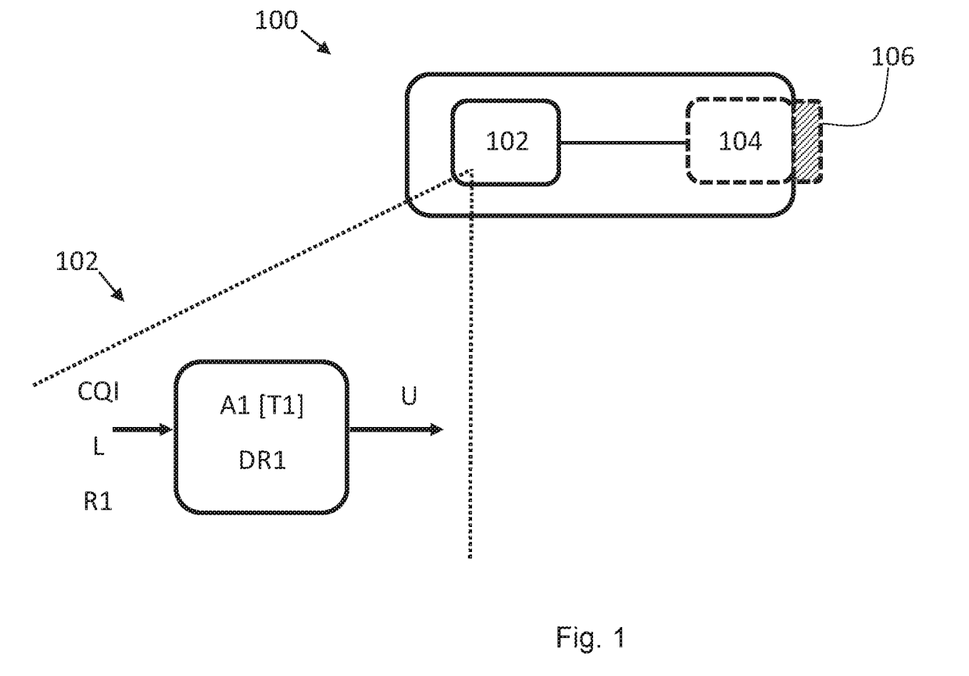
FIG. 1 shows a first network node according to an embodiment of the invention.

FIG. 1 shows an embodiment of a first network node 100 according to the invention. The network node 100 comprises a processor 102 (also illustrated in the enlarged view in FIG. 1) configured to obtain channel quality information CQI for at least one user device 400 (shown in FIGS. 2, 5 and 6) and to obtain a load information L for first radio access (RA) resources R1. The processor 102 is further configured to determine a first association A1 of the first RA resources R1 to the user device 400 based on the channel quality information CQI and the load information L. The first association A1 being valid during a first validity time period T1. The processor 102 is further configured to compute first user data rates DR1 for the first RA resources R1 based on the channel quality information CQI. The processor 102 is further configured to determine a utilization U of the first RA resources R1 based on the first association A1 and the first user data rates DR1. The utilization U of the first RA resources R1 indicates RA resource to be used for transmission or reception of data to or from the user device 400.

The first network node 100 can be configured to act as a network access node or a network control node (e.g. a base station controller). In the capability as a network access node, such as a base station or an access point, the network node 100 may comprise a transceiver 104 and an optional antenna 106 as also illustrated in FIG. 1.

An RA resource may refer to a carrier or a channel which is a piece of continuous spectrum of frequencies of a certain bandwidth provided by a network access node for user device' transmissions. An RA resource may be implemented by one or more antennas and/or antenna elements belonging to suitable network nodes.

The channel quality information CQI indicates the quality of the radio channel. The channel quality information CQI can be obtained from measurements of known reference signals, e.g. beacon signals, either from the user device 400 made by a network access node or vice versa. Examples of the channel quality information CQI can be the received power or the received quality of the measured signals.

The load information L is a measure of the data volume demand in a specific network area. It can, as an example, be the number of user devices that actively require RA resources at a given time. In another example the load information L can be based on the user devices having a channel quality information CQI higher than a specific threshold value. In yet another example the load information L can further include the measurements of potentially active user devices, based on channel quality information CQI together with historical activity factors. In a further example the load information L can be represented by a congestion measure generated from active queue management methods for packet queues in one or more network nodes. The congestion measure can be weighted and averaged both over time and over multiple queues that may correspond to different radio accesses in different network nodes.

The first association A1 is in one example a binary matrix indicating for each user device and each RA resource whether the pair can actively be used. Every row in the matrix represents a user device and each column represents a RA resource in this particular example. Hence, the first association A1 indicates the RA resources that a user device is entitled to use for its transmissions.

Figure 2:
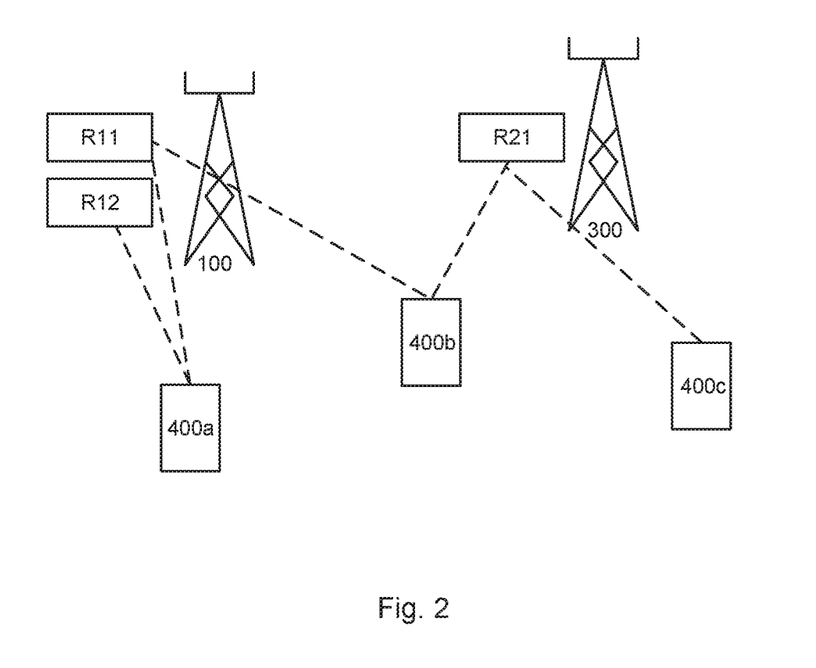
FIG. 2 illustrates association of RA resources to user devices.

In FIG. 2, three user devices 400a, 400b, and 400c are shown. Further, a first network node 100 and a second network node 300 are also shown. RA resources R11 and R12 are available at the first network node 100 and RA resources R21 are available at the second network node 300. Each user device 400a, 400b, and 400c has been associated to a subset of the available radio access resources R11, R12 and R21 illustrated in FIG. 2 with the dashed lines. In the example in FIG. 2 the first association A1 can in one example be represented in matrix form as:

$$\begin{array}{c} & R11 \; R12 \; R13 \\ 400a \\ 400b \\ 400c \end{array} \begin{bmatrix} 1 & 1 & 0 \\ 1 & 0 & 1 \\ 0 & 0 & 1 \end{bmatrix},$$

where user device 400a is associated to RA resources R11 and R12; user device 400b is associated to RA resources R11 and R21; and user device 400c is associated to RA resources R12.

The first validity time period T1 is optimally imagined as the time period when the wireless communication system can be considered as stationary. As an example it would reflect the time period during which the first association A1 is valid, meaning that during this time period the mobility of the user devices do not affect the RA resource association decision. For example, in a scenario with highly mobile user devices the first association A1 has to be updated more often than in a scenario with mostly stationary user devices. The time period during which the wireless communication system can be considered as stationary can also vary over the day in the same scenario and therefore the first validity time period T1 will have to be changed accordingly.

The utilization of the first RA resources R1 is an allocation of RA resources for data transmissions to and from a user device 400. The utilization indicates a subset of the RA resources that will actually be used for transmission to or from the user device 400. For the exemplary RA resource association in FIG. 2 above one possible utilization of the RA resources RA11, RA12 and RA21 could be represented in matrix form as:

$$\begin{array}{c} & R11 \; R12 \; R13 \\ 400a \\ 400b \\ 400c \end{array} \begin{bmatrix} 1 & 1 & 0 \\ 0 & 0 & 1 \\ 0 & 0 & 1 \end{bmatrix},$$

where user device 400a is utilizing both R11 and R12, while user device 400b and 400c is only utilizing R21 although it may be associated to both R11 and R21 as indicated in the RA resource association matrix above.

Figure 3:
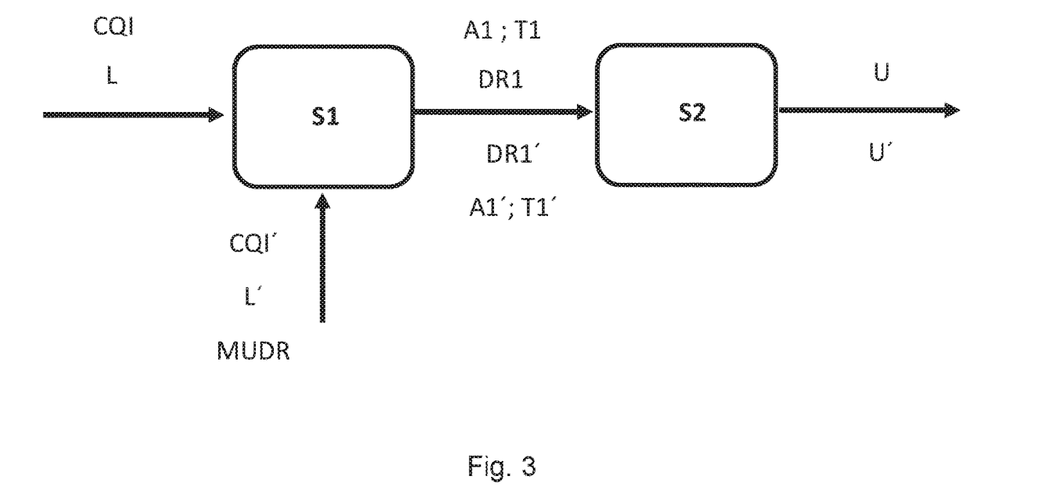
FIG. 3 shows schematically an illustration of an embodiment of the invention.

FIG. 3 shows an illustration of the present solution using so called functional blocks. It is shown in FIG. 3 that the channel quality information CQI and the load information L is input to functional block S1 which determines the first association A1 and computes the first user data rates DR1. The second functional block S2 takes as inputs the first association A1 and the first user data rates DR1 and outputs the utilization U of the first RA resources R1. The first S1 and second S2 functional blocks can be functions or applications executed in the processor 102. Other implementations of S1 and S2 are also possible.

The method of determining the first association A1 and determining the utilization U of the first RA resources R1 can according to further embodiments be iteratively performed, which is also illustrated in FIG. 3. Therefore, block S1 is configured to obtain new channel quality information CQI' for the user device 400 during the first validity time period T1. Block S1 is configured to compute updated first user data rates DR1' for the first RA resources R1 based on the new channel quality information CQI'. Block S2 is configured to determine an updated utilization U' of the first RA resources R1 based on the first association A1 and the updated first user data rates DR1'.

In another embodiment block S1 is configured to obtain new load information L' and obtain measured user data rates MUDR during the first validity time period T1. Further, block S1 is configured to determine an updated first association A1 based on the new load information L' and the measured user data rates MUDR.

In another embodiment block S1 is configured to determine an updated first validity time period T1' for the updated first association A1 based on any of the obtained channel quality information CQI' and the measured user data rates MUDR.

As aforementioned, embodiments of the invention relate to scheduling the utilization of RA resources at network nodes in a network area having multiple available RA resources, and for determining the associations of user devices to RA resources available in the network area. Embodiments of the invention also relate to controlling each user device's dynamic selection of one or more RA resources among a user device's associated RA resources and indicating the configurations of the utilization.

A challenge is how to determine which RA resources the user devices may be associated with and utilize for transmissions in the uplink or downlink. Herein, associating the RA resources with user devices should result in a set of user device to RA resource associations that maximize network utilization of the long time-scale operations. Selective utilization of RA resources by a user device, which is related to the short time-scale operations, refers to the selection of and transmission via a subset of the RA resources associated with the user. Long time-scale operations follow traffic load variations and longer term statistics, such as shadowing and path-loss, and apply to time-scales of seconds or minutes. In contrast, short time-scale operations adapt to channel variations at scales of milliseconds due to multi-path fading. The former corresponds to a set of static or semi-static radio resource management (RRM) solutions where RA resources are assigned to user devices determined by an objective function maximizing longer term statistics. The latter corresponds to a set of dynamic approaches where each user utilizes its assigned RA resources based on short term channel fading conditions. Coordinated multi-point transmission (CoMP) is an example that enables dynamic multi-point to point transmission coordination at short time-scales. Loading balancing (LB), inter-cell interference coordination (ICIC), and dual connectivity (DC) are examples of long time-scale solutions.

Therefore, as was illustrated in the FIG. 3, the present solution may be divided in the two major functional blocks S1 and S2 that may be performed iteratively. The first block S1 performs the RA resource association, solving the long time-scale allocation objective, and the second block S2 performs RA resource utilization, solving the short time-scale allocation objective. RA resource association is based among others on user devices' traffic load, and average throughput as conditioned on the system configuration and multi-RA resource utilization operation. The first function S1 addresses objectives associated with load-balancing and switching on/off of radio access resources, a kind of ICIC, and therefore is based on the average user data rate and the user traffic demands. The second function S2 addresses objectives associated with the MRTD, taking into account ICIC and discontinuous transmission (DTX).

RA resource utilization function S2 therefore receives, from the multi-RA resource association function S1, a set of RA resource associations for each user device and decides on a per-TTI basis which RA resources to utilize. Herein, TTI refers to the time transmission interval that user devices are scheduled for transmission within a RA resource. The duration of the TTI may be configured by the network.

In RA resource utilization function S2, the RA resource associations from function S1 are used to perform RA resource dynamic selection based on short-term channel conditions associated, e.g. fast fading or interference. The selection depends on the MRTD and the ICIC scheme configuration and is based on short-term channel conditions associated with fast fading. The RA resource utilization function S2 may also receive a system configuration indication determining which MRTD and ICIC scheme to be used. It has to be noted that MRTD configuration can be per RA resource or network node or per user device or for the entire network. ICIC configuration can be per spectrum segment, network node or for the entire network. In the absence of such an indication, the RA resource utilization may be alternatively set to autonomously determine the MRTD and ICIC schemes' configuration based on the user traffic demand, user device and RA resource distribution and their respective densities in the area.

The RA resource utilization function S2 feeds back to the RA resource association function S1 user data rate statistics, including at least the measured user data rate, as well as the user data rate deviation from the average user data rate of all user devices in the RA resources, and the averaging time period as indicated by the system configuration. It may also include other user data rate related metrics, such as user data rate standard deviation or the associated confidence interval. In one alternative the target deviation and averaging window period and the other statistical targets which constitute system configuration information are set by the RA resource utilization.

The RA resource association function S1 receives the expected user data rate per system configuration option, as well as the deviation for at least one time period length and/or the average time period for a certain deviation value, and solves the long time scale optimization of the RA resources association by considering the average traffic load, and RA resources in the network area. Variation of the deviation or the length of subsequent time periods may characterize traffic load changes and trigger re-association adjustments. The expected user data rate may depend on both on what data rate the user device can get from the network and how much data the user device has to send, i.e. what traffic demand the user device actually has. The traffic demand may be derived from Quality of Service (QoS) parameters such as guaranteed bit rate, maximum bit rate or aggregate maximum bit rate, or from knowledge about the applications of the user device.

In case there is no information about a user device's traffic demands, the expected user data rate may refer to a measured data rate as a function of both the above factors estimated from historical values or to what can be expected based on SINR and bandwidth assuming that there is always data to transmit. In addition, RA resource association may derive the target deviation and averaging window period and the other statistical targets which constitute system configuration information. The target deviation, averaging window, as derived by the RA resource association function S1 may be used to characterize the traffic profile and user device and RA resource distribution in a network area.

Solving each of the two problems of RA resource association and RA resource utilization can be performed either in a centralized manner based on a network control node or in a distributed manner based on information exchange between network access nodes, or between network access nodes and user devices. The RA resource association can be solved by means of a heuristic gradient ascend approach, such as simulated-annealing. Alternatively, the RA resource association can be solved based on a distributed algorithm which exploits Lagrange duality theory to associate users with multiple RA resources, while enabling RA resources with no traffic to be powered off.

In RA resource utilization, the multiple RA resource associations from function S1 is used to perform RA resource dynamic selection based on short-term channel conditions associated with fast fading. For actual selection of RA resources a heuristic MRTD-based selection scheme can be exploited where the selection of RA resources for a user device is based on the expected instantaneous user data rate at that RA resources. Under certain conditions the above scheme can be performed in a distributed manner with non-ideal back-haul. In RA resource utilization, different frequency reuse ICIC schemes and spectrum split between network layers, such as, macro-tier and pico-tier, can be estimated.

Figure 4:
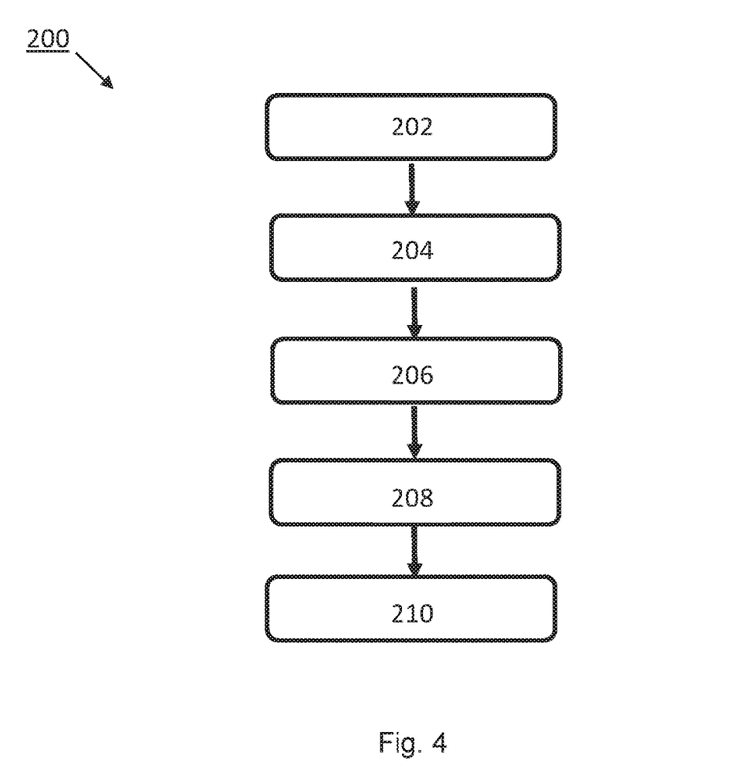
FIG. 4 shows a method according to an embodiment of the invention.

FIG. 4 shows a method 200 according to an embodiment of the invention which may be executed in a network node 100, such as the one shown in FIG. 1. The method 200 comprises the step of obtaining 202 channel quality information CQI for a user device 400. The method 200 further comprises the step of obtaining 204 load information L for first RA resources R1. The method 200 further comprises the step of determining 206 a first association A1 of the first RA resources R1 to the user device 400 based on the channel quality information CQI and the load information L. The first association A1 is valid during a first validity time period T1. The method 200 further comprises the step of computing 208 first user data rates DR1 for the first RA resources R1 based on the channel quality information CQI. The method 200 further comprises the step of determining 210 a utilization of the first RA resources R1 based on the first association A1 and the first user data rates DR1. The utilization of the first RA resources R1 indicates RA resource to be used for transmission or reception of data to or from the user device 400.

Figure 5:
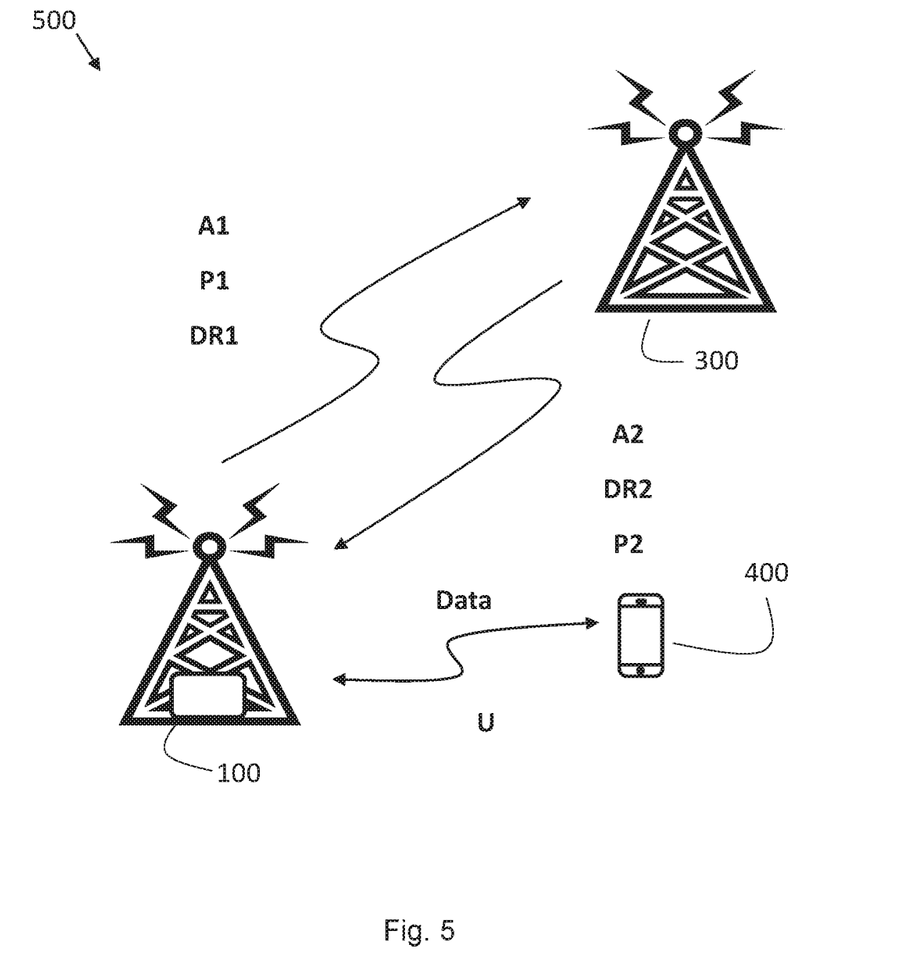
FIG. 5 illustrates the interaction between a first network node and a second network node.

FIG. 5 illustrates an exemplary embodiment in which the first network node 100 is configured to act as a network access node in interaction with at least one second network node 300 also acting as a network access node. In this embodiment signaling is performed between the first network node 100 and the second network node 300 as described below.

In one embodiment, the first network node 100 is configured to transmit/signal the first association A1 the second network node 300.

Further, in one embodiment the first network node 100 is configured to transmit a first configuration parameter P1 to the second network node 300. The first configuration parameter P1 indicates the first validity time period T1 related to the first association A1. In one embodiment the first configuration parameter P1 further indicates utilization policy information for the first association A1. The utilization policy information may e.g. indicate policies for how many RA resources a user device should be associated to simultaneously, and how many RA resources a user device should be utilizing simultaneously.

Further, in one embodiment the first network node 100 is configured to transmit the first user data rates DR1 to the second network node 300.

The second network node 300 is configured to transmit/signal to the first network node 300 as shown in FIG. 4.

In one embodiment, the first network node 100 is configured to receive a second association A2 of second RA resources R2 to the user device 400 from the second network node 300. The first network node 100 is configured to determine the utilization of the first RA resources R1 further based on the second association A2.

Moreover, the first network node 100 is configured to receive second user data rates DR2 for the second RA resources A2. The first network node 100 configured to determine the utilization of the first RA resources R1 further based on the second user data rates DR2.

Furthermore, the first network node 100 is configured to receive a second configuration parameter P2 for the second association A2. The second configuration parameter P2 indicates a second validity time period T2 for the second association A2. The first network node 100 is configured to determine the utilization of the first RA resources R1 further based on the second validity time period T2. The second configuration parameter P2 may in a further embodiment indicate utilization policy information for the second association A2.

FIG. 5 also illustrates the embodiment in which the first network node 100 is configured to communicate directly with the user device 400. In this respect, the first network node 100 is configured to transmit the utilization U of the first available RA resources R1 to the user device 400. Moreover, the first network node 100 is configured to transmit or receive data to or from the at least one user device 400 according to the utilization of the first RA resources R1.

Figure 6:
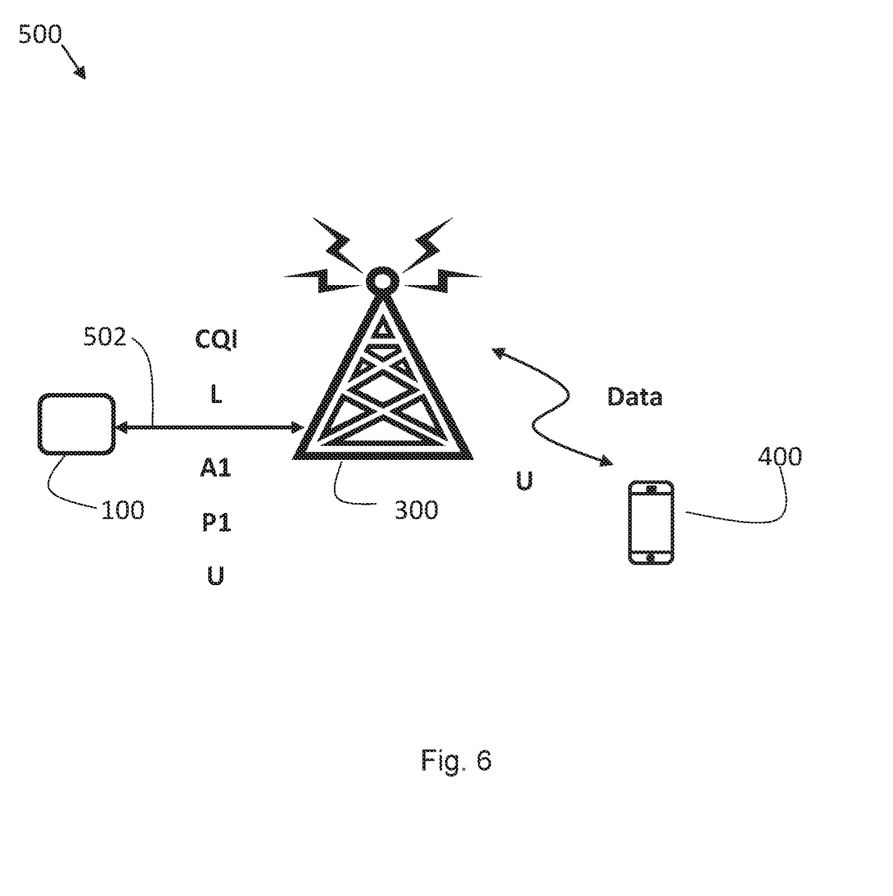
FIG. 6 shows a further embodiment of the invention.

FIG. 6 shows another exemplary embodiment of the invention. In this embodiment the first network node 100 is configured to act as a network control node in interaction with at least one second network node 300 acting as a network access node. The first network node 100 and the second network node 300 may be communicably coupled to each other via a back-haul link 502 in one example. The second network node 300 is in connection with at least one user device 400 (only one user device is shown in FIG. 5). The first network node 100 may receive channel quality information CQI and load information from the second network node 300. The first network node determines the first association A1 and the utilization U and transmit mentioned first association A1 and utilization U to the second network node 300. The first parameter P1 may also be sent to the second network node 300.

For a yet deeper understanding of embodiments of the invention, the following disclosure describes system models and system model assumptions in relation to embodiments of the invention. However, embodiments of the invention are not limited thereof.

It is also to be noted that in the following disclosure the terms and expressions "user" and "mobile user" correspond to the aforementioned user device 400, which may be any of a User Equipment (UE), mobile station (MS), wireless terminal or mobile terminal which is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

A wireless communication system 500 is considered where network nodes, labelled j=1, . . . , N, overall utilizing a frequency band of $W_j$, can be configured to operate in multiple frequency spectrum resources, s=1, . . . , S, hereafter referred to as frequency spectrum segments, of size $W_j^{(s)}$. In LTE terminology, a spectrum segment is a frequency component carrier with a predefined bandwidth. In one other example, a frequency spectrum segment is the frequency bandwidth associated with a RAT available at a network node.

The pair (j,s) which refers to the spectrum segment s at network node j, corresponds to a RA resource. Thus, at any time a maximum of R=N×S radio accesses of one or multiple RATs, or RAT component carriers, are available to the mobile users, i=1, . . . , M. Further we use $\gamma_{i,j}^{(s)}$ to denote the signal to interference and noise ratio (SINR) of a user i with respect to RA resource (j,s), and $c_{i,j}^{(s)}$ the achievable spectral efficiency of a user i when served by RA resource (j,s), theoretically given by the Shannon formula $c_{i,j}^{(s)} = \log_2(1+\gamma_{i,j}^{(s)})$. The average data rate offered by RA resource (j,s), assuming an equal share of time-frequency resources among the served users, is denoted by $r_{i,j}^{(s)}$ and given by $r_{i,j}^{(s)} = W_j^{(s)} \log_2(1+\gamma_{i,j}^{(s)})/\rho_j^{(s)}$ where $\rho_j^{(s)}$ is the (average) number of users (actively) served by RA resource (j,s). The association variable between a user i and a spectrum segment s of access node j, is denoted by $x_{i,j}^{(s)}$ with $x_{i,j}^{(s)}=1$ if user i is associated with RA resource (j,s); zero otherwise. Given $x_{i,j}^{(s)}$ then $\rho_j^{(s)}$ becomes $\rho_j^{(s)} = \rho_0 + \Sigma_i x_{i,j}^{(s)}$, $\forall j$, where $\rho_0$ is an arbitrary small positive constant denoting a load offset for dormant network nodes, i.e., access nodes without users associated.

The problem of association of users to multiple RA resources can be formulated as a relaxed network utility maximization problem based for instance, on a logarithmic function of the user data rate, such as, $u_{i,j}^{(s)}(r_{i,j}^{(s)}) = \log(r_{i,j}^{(s)})$. The problem can be formulated as follows:

$$\text{minimize} \sum_i \sum_j \sum_s x_{i,j}^{(s)} \log(W_j^{(s)} c_{i,j}^{(s)}) - \sum_j \sum_s (\rho_j^{(s)} - \rho_0) \log(\rho_j^{(s)}) \quad (1)$$

$$\text{subject to} \sum_j \sum_s x_{i,j}^{(s)} \le K_i, \forall i,$$

$$\rho_j^{(s)} = \rho_0 + \sum_i x_{i,j}^{(s)} \forall i, s,$$

$$\rho_j^{(s)} \in [0, \rho_{j,max}^{(s)}] \forall i, s,$$

$$x_{i,j}^{(s)} \in 0, 1 \forall i, j, s,$$

To enforce utilization of multiple RA resources by all mobile users, we replace the constraint $\sum_j \sum_s x_{i,j}^{(s)} \le K_i$ with the equality constraint $\sum_j \sum_s x_{i,j}^{(s)} = K_i$. All other constraints from (1) remain unchanged by setting $K_i > 1$, it enforces a mobile user to be simultaneously associated with $K_i$ RA resources.

In one embodiment of the invention and by exploiting Lagrange duality theory, the problem (1) with the equality constraint $\sum_j \sum_s x_{i,j}^{(s)} = K_i$, can be solved in a distributed way among a network control node and network access nodes. The network control node determines mobile users' association to RA resources so as to maximize their average data rate and signals the user to RA resource associations to the access nodes operating the RA resources. Network access nodes, in turn, determine an estimate of the optimal load $\rho_j^{(s)}$ and an associated congestion measure $\lambda_j^{(s)}$ per RA resource, which is sent back to the network control node. Upon reception of the network access nodes' load indication, the network control node determines up to $K_i$ RA resources for each user i to use, not necessarily co-located at the same network access node, by selecting the set $\mathcal{K}_i$ of the best $K_i$ pairs (j*,s*) fulfilling equation (2):

$$(j^*, s^*) = \underset{j,s}{\arg\max}(\log(W_j^{(s)} c_{i,j}^{(s)}) - \lambda_j^{(s)}), \quad (2)$$

In one embodiment the congestion measure $\lambda_j^{(s)}$ of RA resource (j,s) can be solved by network node j as follows:

$$\lambda_j^{(s)}(t+1) = \left[\lambda_j^{(s)}(t) - \epsilon\left(\rho_j^{(s)}(t) - \rho_0 - \sum_i x_{i,j}^{(s)}(t)\right)\right]^+ \quad (3)$$

where $\epsilon$ is a sufficiently small constant and $[\cdot]^+$ denotes a projection in the positive orthant, i.e. with all elements being positive, $\rho_0$ is an arbitrary small positive constant denoting a load offset for dormant RA resources, i.e., RA resources without users associated, and $\rho_j^{(s)}$ is calculated by:

$$\rho_j^{(s)}(t+1) = \min\left\{\rho_{j,max}^{(s)}, e^{\lambda_j^{(s)}(t) - \frac{\rho_j^{(s)}(t) - \rho_0}{\rho_j^{(s)}(t)}}\right\} \quad (4)$$

to a maximum of $\rho_{j,max}^{(s)}$ for each RA resource (j,s).

In another embodiment the congestion measure $\lambda_j^{(s)}$ can be based on queue management in the network access nodes. Equation (2) may change slightly to be expressed as:

$$(j^*, s^*) = \underset{j,s}{\arg\max}(\log(W_j^{(s)} c_{i,j}^{(s)}) - W_j^{(s)} c_{i,j}^{(s)} \lambda_j^{(s)}).$$

The congestion measure can be based on the same congestion measure which is feedback to the end systems, i.e. the end-to-end source and receiver nodes, in the form of e.g. explicit congestion notification or packet losses. However, the congestion measure $\lambda_j^{(s)}$ can be a filtered version of the congestion measure derived from the queues, in particular it may be averaged over time (low pass filtered). This embodiment has the advantage that it implicitly reflects the traffic generated per user and the actual load in the ANs, not only the number of users. It can also be generalized to multiple priority classes of the traffic by observing the principle that the congestion level in a priority class should reflect the both the congestion in its own class and the congestion level of lower priority classes. A resource allocation algorithm can therefore use the knowledge of the measured congestion level in each class together with knowledge of the QoS configuration of each user to determine its preferred connection point. The congestion levels of the ANs should be reported as load information to the controller that handles the RA resource association.

In this embodiment, it may be possible to avoid the iterative process of testing different RA resources for each user in case the total traffic of each user would not have a significant impact on the congestion level of the RA resources. This would be the case if the total traffic carried by the RA resources is high compared to the traffic generated by a user, or if the congestion measure used in the decision is a relatively long-term average value that is likely to remain at a similar level due to session arrivals and departures. However, this may not be the case in a UDN where the number of users per RA resources may small. It would therefore be necessary to estimate the effect on the congestion measure from the addition of another user in an RA resources.

In another embodiment, the user association problem can be solved in a centralized way within a network control node by means of a meta-heuristic method that performs gradient-ascend search to find an optimal solution. Such a meta-heuristic method can build on the simulated annealing approach. Simulated annealing is a variation of hill climbing, in which at the beginning of the process, the algorithm allows some downhill movements. By doing so the algorithm allows exploration of the whole state space turning the final solution insensitive to the initial state.

According to the simulated annealing approach, the network control node determines mobile users' association to RA resources so as to maximize a utility value and determines up to $K_i$ RA resources for each user i to use. Algorithm 1 which is an implementation of the simulated annealing algorithm.

---

Algorithm1 Simulated-annealing based for mobile user (or user device) to RA resource association

--- input: problem = multi-RA resource association problem with
  M user devices, R RA resources
    schedule, a mapping from time to temperature
  local variables: A1 current multi-RA-user association
    A1', successor multi-RA-user association
    τ, a "temperature" controlling the probability of downward
steps e.g., the time the algorithm has been running
  A1 ← initial_vector[problem]
  for t ← 1 to ∞ do
    τ ← schedule[t]
    if τ = 0 then return A1
    $\tilde{A1}'$ ← a randomly selected successor of current vector A1
    ΔE ← utility[$\tilde{A1}'$] - utility[A1]

---

Algorithm 1: The simulated annealing search algorithm, a version of stochastic hill-climbing where some downhill moves are accepted readily early in the annealing schedule and then less often as time goes on. The value □ is defined as a function of time.

Algorithm 1 starts the searching process from an initial RA resource association vector with mobile user i associated to $K_i$ RA resources randomly selected within user's proximity. Alternatively, the $K_i$ RA resources with the highest reference signal received power (RSRP). At each step the temperature variable is adjusted and a successor association vector is generated. The generation of a successor vector is performed by changing one (or more) of the $K_i$ RA resources associated with a user. At each successor generations one or more users are selected randomly with a probability value determined by the control node. An estimation of the network optimization utility, e.g. expressed in user sum rate or sum of log user rate, for the successor association vector is compared with the current association vector. If the utility value of the successor vector is higher than the one of the current vector, i.e., ΔE>0, then the successor vector becomes the new current vector. In other case, i.e., ΔE≤0, the successor vector becomes the current vector with a probability $P_{succ}$, which is defined as a function of ΔE and τ. The value τ may be also defined as a function of time. The new association vector is communicated by the control node to the access nodes of the RA resources. It can be proven that if i decreases slowly enough, then simulated annealing search will find a global optimum with probability approaching 1.

In one embodiment of the second RA resource utilisation function S2, the objective is to select among these RA resources associated to a user, each association being subject to fast fading over a time interval of multiple TTIs, so that a user's throughput is increased. In other words, at each TTI t, each mobile user i will select one or multiple instances among its $K_i$ associated RA resources in $\mathcal{K}_i$ from step 1 depending on the MRTD scheme used. The selection of RA resources (j*,s*) for a mobile user i is based on its expected instantaneous user throughput as follows:

$$(n^*, s^*)^* = \operatorname*{argmax}_{j,s}(\hat{W}_j^{(s)} \hat{c}_{i,j}^{(s)}(t) / \hat{\rho}_j^s(t)), \forall (j, s) \in \mathcal{K}_i \quad (5)$$

where $\hat{\rho}_j^{(s)}(t)$ denotes an estimation of the instantaneous load expected in RA resource (j,s) at time t, $\hat{W}_j^{(s)}$ is the available bandwidth of RA resources (j,s), and $\hat{c}_{i,j}^{(s)}(t)$ is the spectral efficiency at the tth time transmission interval achievable by using Shannon bound.

Compared to the function S1 where spectral efficiency considers only the effects of path loss and shadowing, in function S2 the achievable spectral efficiency $\hat{c}_{i,j}^{(s)}(t)$ considers the effects of (Rician or Rayleigh) fading. The available bandwidth $\hat{W}_j^{(s)}$ of an RA resource is determined by the spectrum division ratio, which denotes the portion of the spectrum used by the RA resource, and the frequency reuse F, which further splits the used spectrum among the access nodes so as to decrease inter-RA resource interference. Generally, for a spectrum segment s operated by access node j with spectrum division ratio of Φ and frequency reuse F, the size of the bandwidth of the corresponding RA resources (j,s) that can be used in (5) is $\hat{W}_n^{(s)} = W_i^{(s)} \Phi/F, \forall j, s$.

The concept of multi-radio transmission diversity (MRTD) refers to the dynamic selection of multiple radio accesses for the transmission of a user's data and it can be thought of as consisting of a packet scheduler operating across multiple radio access interfaces. MRTD is mainly characterised based on its level of transmission parallelism. Parallelism determines the concurrent utilization of a number of RA resources at a given instance of time for the transmission of a user's data. With regards to parallelism the following MRTD schemes are envisaged:

Switched MRTD (SMRTD) implies that each mobile user i, may utilize one and only one of the $K_i$ radio accesses in $\mathcal{K}_i$ for data transmission at any time transmission interval (TTI). The radio access a user is allocated can be different from TTI to TTI.

Parallel MRTD (PMRTD) implies that a mobile user may utilize all $K_i$ radio accesses in $\mathcal{K}_i$ simultaneously at any TTI. For the PMRTD, each data payload is transmitted by only one radio access.

Independent MRTD (IMRTD) implies independent radio accesses where each user entering the system utilize one and only one single radio access at all TTIs.

A realisation of SMRTD implies that only one single RA resource among the $K_i$ RA resources will be selected for each mobile user i, hence, increasing the load of that RA resource. Different RA resources (j*,s*)∈$\mathcal{K}_i$ can be selected between a time instance t and the next for a mobile user i as determined by the fast fading channel coefficient. On the opposite side, the realisation of PMRTD does not imply that all associated RA resources (j*,s*)∈$\mathcal{K}_i$ are selected for simultaneous transmission by a user i. If there are two RA resources among those associated with a user that are provided by two different access nodes in the same spectrum segment, i.e., operating on the same frequency band and/or RAT, then the one with the highest expected instantaneous user throughput is selected and the user is removed from the load of the other. Assuming that each user can select only G RA resources among its associated RA resources G≤$K_i$, then in radio networks where each access node deploys S spectrum segments a user can select a maximum of G=S RA resources when utilising PMRTD.

It follows from the realisation of MRTD that in PMRTD and for certain frequency reuse schemes all (j*,s*)∈$\mathcal{K}_i$ are selected and used simultaneously by a mobile user i adding to the load of each (j,s) RA resource. On the opposite side, the realisation of SMRTD implies that only one, e.g., the kth, among the $K_i$ RA resources will be selected for each mobile user i adding to the load of only the kth RA resource. Different RA resources (j*,s*)∈$\mathcal{K}_i$ can be selected between a time instance t and the next for a mobile user i as determined by the fast fading channel coefficient. Evaluating the instantaneous user throughput of a user i at time t requires a-priori knowledge of the user's channel fading coefficient and the load in the associated (j,s) RA resources. Consequently, evaluating the expected instantaneous user throughput of a mobile user i at RA resources (j,s) requires an estimation of its load.

In one embodiment, the expected instantaneous load of an RA resource (j,s) at time t, given by $\hat{\rho}_j^s(t)$, is estimated based on the maximum load offered to RA resources (j,s) as a result from the RA resource association function S1. Clearly, the maximum load of RA resources (j,s) corresponds to the maximum number of users associated with it. Consequently, at each time instance t the instantaneous expected load $\hat{\rho}_j^s(t)$ of RA resources (j,s) that can be used in (5) is estimated by:

$$\hat{\rho}_j^s(t) = \sum_i x_{i,j}^{(s)} \forall t \quad (6)$$

It has to be noted that the actual load of RA resources (j,s) at any TTI t will be different depending on the RA resource association election of the users and the MRTD scheme employed. In a distributed solution the information about a mobile user's RA resource associations $x_{i,j}^{(s)}$ and the load $\hat{\rho}_j^s$ at TTI t of these associations are delivered by the mobile users and the access nodes respectively. In a centralized solution, such as Algorithm 1, this information can be distributed by a network node that performs central control. Alternatively, the associations can be delivered by the mobile users and the corresponding loads of the associated RA resources by the central network node.

In another embodiment, the congestion measure can be used also in the RA resource utilization function S2. The main difference is that the congestion information would not be averaged over a long time period, as in the RA resource association function S1.

In another embodiment where no exact information about a user's channel fading coefficient or spectral efficiency or bit-rate exists, the instantaneous selection of the RA resources (j,s) can be based on a threshold value in addition to the load $\hat{\rho}_j^s(t)$. The threshold value may represent the minimum bit-rate or the average bit-rate expressed in absolute terms or in terms of probability of being served above minimum bit-rate and average bit-rate respectively. The probability can be estimated based on performance measurements derived from within a short history window of $\tau_w$ size in TTIs, i.e., based on statistics of the last $\tau_w$ TTIs.

Figure 7:
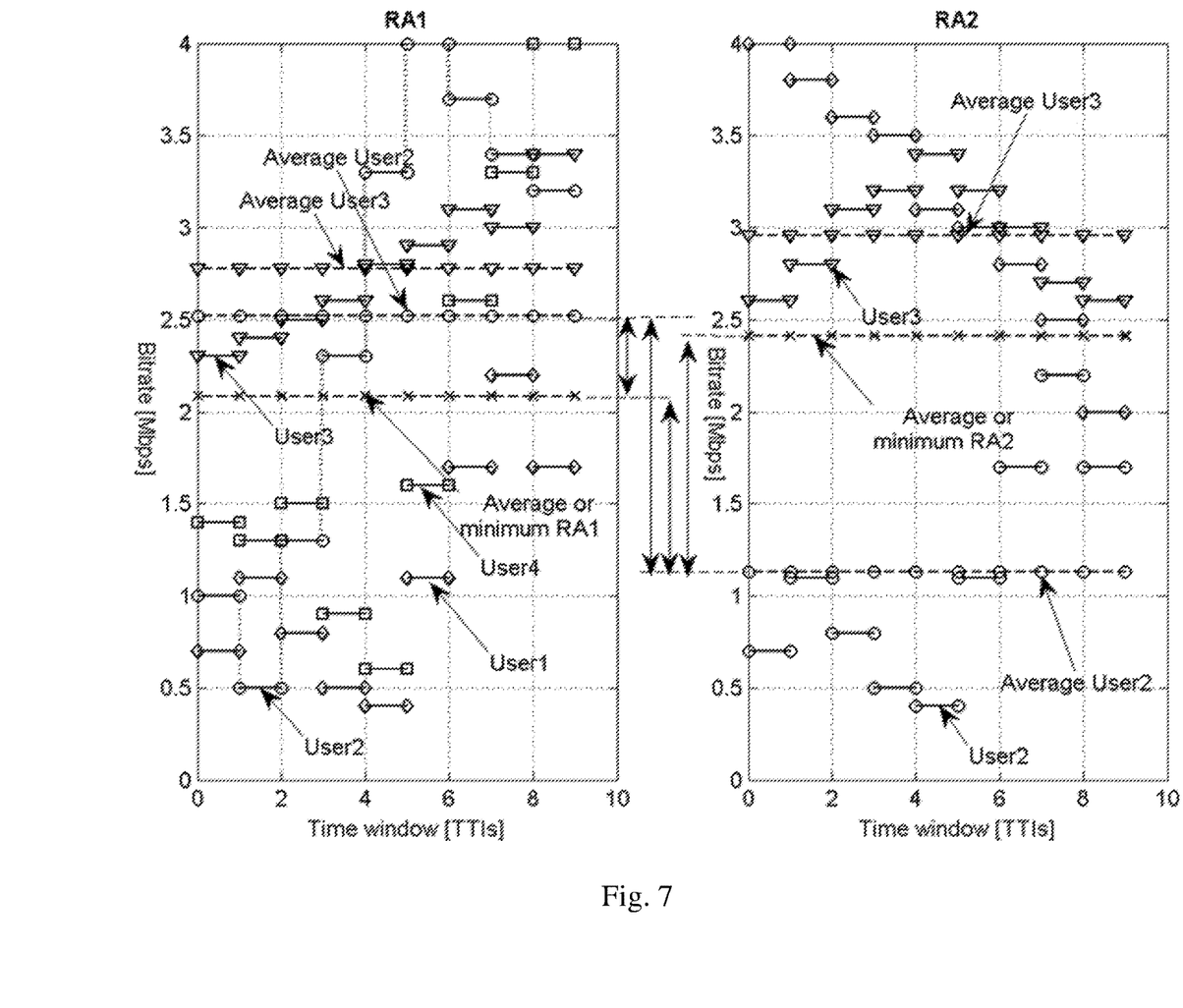
FIG. 7 shows an example illustrating different user rates at two different RA resources.

FIG. 7 illustrates different user data rates at two different RA resources, i.e. RA1 and RA2, with common user devices, User1, User2, User3 and User4 during a time period of $\tau_w=9$ TTIs. FIG. 7 depicts the instant data rates of the user devices at nine subsequent TTIs comprising the averaging window. Also, the average rates of User2 and User3 of RA1 and RA2 are shown along with the average rate of all users of RA1 and RA2.

With further reference to FIG. 7, based on a RA resource association determined in function S1, network nodes controlling RA1 and RA2, respectively, exchange information about their corresponding average bitrates of the common User2. By inspection of the absolute values this would in an SMRTD scheme imply a justification for $\tau_w+1$ of $\hat{\rho}_1^s(\Sigma_w+1)=\hat{\rho}_1^s(\tau_w)$ and $\hat{\rho}_2^s(\tau_w+1)=\hat{\rho}_2^s(\tau_w)-1$ by RA1 and RA2, respectively. That is, User2 would only be served by RA1 in the next time period T1' because RA2 provides a lower data rate to User2 than RA1 does. Alternatively, the network nodes controlling the RA resources may exchange the ratio of the average bit-rate of a user over the average bit-rate of the RA resources. Again in SMRTD a ratio above 1.0 would indicate a justification that the association should remain and a ratio below 1.0 may indicate that the user has a worse spectral efficiency than the average user in RAj (wherein j denotes a sub-index) than the average user in RAj and therefore be a justification that the user device should not use RAj in the next time interval. Hence, $\hat{\rho}_j^s(t)$ would be reduced by one as in the case of $\hat{\rho}_2^s(\tau_w+1)$ above. The average bit-rate of each user and each RA resource, collected from an averaging window $\tau \cdot \tau_w$, $\tau=1, 2, \ldots$, is fed back to the RA resource association function S1.

In another embodiment, absolute values and threshold difference between RA resources may be indicative whether SMRTD or PMRTD method should be employed to deliver a mobile user's data. A large difference between the average bit-rate values of a user in the two RA resources would imply the employment of SMRTD for the data transmission of that user. This is the case for User2 in the example of FIG. 7. A small difference between the average bit-rate values of a user in the two RA resources would indicate the employment of PMRTD. The information may be extended to also include the variation in the bit rate of a user. In that case SMRTD could also be employed for smaller differences when the bit-rate variations are low. For large variations PMRTD could be the choice of preference. The value above which a difference is deemed large or small may be determined by a central network node, i.e. centralized solution, or agreed between network nodes, i.e. distributed solution.

In addition to the level of parallelism, MRTD can also be characterised based on the reselection rate and the level of redundancy employed. The reselection rate corresponds to the time interval when an RA resource reselection decision can be made. Redundancy refers to the possibility to transmit the same data over two or more RA resources so as to improve reliability. These two characteristics are relevant when considering practical aspects of the MRTD realisation in conjunction with CoMP and backhaul.

The first aspect refers to the coordination of the parallel transmissions among the access nodes based on parallel MRTD with or without redundancy. Within 3GPP LTE-A, CoMP refers to a set of techniques, such as dynamic point selection (DPS), that enable dynamic coordination of transmission and reception among and from multiple geographically separated network access nodes.

SMRTD actually encompasses DPS where the user data is only transmitted from one point based on dynamic selection in time and frequency. It is possible that PMRTD with redundancy is used to realise a form of joint transmission where data to a mobile user is simultaneously transmitted from multiple network access nodes to improve the quality of the received signal. Another form of joint transmission can be realised by PMRTD without redundancy where multiple transmissions in the same spectrum segment are aggregated to improve a user's throughput. The latter assumes the capability of the mobile device to receive multiple signals in the same spectrum segment from multiple points, which is not possible in current state-of-art.

The second aspect, which regards the reselection rate, is related to the distributed implementation of the MRTD and the requirements on the backhaul. In general, the use of joint transmission is indicative of use cases where a reselection of RA resources at shorter time intervals is required. A high reselection rate implies a lot of signalling among the coordinating network access nodes and requires the existence of an ideal backhaul. In a distributed version of MRTD, the evaluation of equation (3) can be performed by each network access node separately if the fading channel coefficient of its associated mobile users to all other RA resources they are associated with are known as well as the load to these RA resources. Assuming the RA resources load is known from the RA resource association function S1 and estimated according to equation (6), the information about the channel quality of a mobile user to another RA resource can be given by the mobile user itself. The amount of signalling between a mobile user and a network access node can be reduced in the case of collocated RA resources. That is, RA resources deployed by the same network access node and where the channel measurements are already known to the network access node. Furthermore, it is likely that a user is on average associated to approximately two non-collocated network access nodes at any TTI implying a signalling density of two measurements per mobile user and network access node, and a reselection rate proportional to the rate of changes of the fading channel. In most cases where the TTI is significantly shorter than the channel coherence time the need for frequent signalling and high reselection rate decreases along with the requirements for an ideal backhaul.

In this disclosure, a network node 100 may refer to a network control node or a network access node or an access point or a base station, e.g., a Radio Base Station (RBS), which in some networks may be referred to as transmitter, "eNB", "eNodeB", "NodeB" or "B node", depending on the technology and terminology used. The network nodes may be of different classes such as, e.g., macro eNodeB, home eNodeB or pico base station, based on transmission power and thereby also cell size. The network node can be an 802.11 access point or a Station (STA), which is any device that contains an IEEE 802.11-conformant Media Access Control (MAC) and Physical Layer (PHY) interface to the Wireless Medium (WM).

Furthermore, any methods according to embodiments of the invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the first communication device 100 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present first communication device 100 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A first network node for a wireless communication system, the first network node comprising:
a processor configured to:
obtain channel quality information for a user device;
obtain load information for first radio access resources;
determine a first association of the first radio access resources to the user device based on the channel quality information and the load information, the first association being valid during a first validity time period;
compute first user data rates for the first radio access resources based on the channel quality information; and
determine a utilization of the first radio access resources based on the first association and the first user data rates, wherein the utilization of the first radio access resources indicates radio access resource to be used for transmission or reception of data to or from the user device;
a transceiver configured to:
transmit the first association to at least one second network node; and
transmit the first user data rates to the at least one second network node.

2. The first network node according to claim 1, wherein the processor is configured to:
obtain new channel quality information for the user device during the first validity time period;
compute updated first user data rates for the first radio access resources based on the new channel quality information; and
determine an updated utilization of the first radio access resources based on the first association and the updated first user data rates.

3. The first network node according to claim 1, wherein the processor is configured to:
obtain new load information;
obtain measured user data rates during the first validity time period; and
determine an updated first association based on the new load information and the measured user data rates.

4. The first network node according to claim 3, wherein the processor is configured to:
determine an updated first validity time period for the updated first association based on any of the obtained channel quality information and the measured user data rates.

5. The first network node according to claim 1, wherein the transceiver is configured to:
transmit a first configuration parameter to the at least one second network node, the first configuration parameter indicating the first validity time period.

6. The first network node according to claim 5, wherein the first configuration parameter further indicates utilization policy information for the first association.

7. The first network node according to claim 1, wherein the transceiver is configured to:
transmit the utilization of the first available radio access resources to the user device.

8. The first network node according to claim 1, wherein the transceiver is configured to:
transmit or receive data to or from the at least one user device according to the utilization of the first radio access resources.

9. The first network node according to claim 1, wherein the transceiver is configured to:
receive a second association of second radio access resources to the at least one user device from the at least one second network node;
wherein the processor is configured to:
determine the utilization of the first radio access resources further based on the second association.

10. The first network node according to claim 9, wherein the transceiver is configured to:
receive second user data rates for the second radio access resources;
wherein the processor is configured to:
determine the utilization of the first radio access resources further based on the second user data rates.

11. The first network node according to claim 9, wherein the transceiver is configured to:
receive a second configuration parameter for the second association, the second configuration parameter indicating a second validity time period for the second association; and
determine the utilization of the first radio access resources further based on the second validity time period.

12. The first network node according to claim 11, wherein the second configuration parameter further indicates utilization policy information for the second association.

13. A method implemented in a wireless communication system, the method comprising:
obtaining channel quality information for a user device;
obtaining load information for first radio access resources;
determining a first association of the first radio access resources to the user device based on the channel quality information and the load information, the first association being valid during a first validity time period;
computing first user data rates for the first radio access resources based on the channel quality information;
determining a utilization of the first radio access resources based on the first association and the first user data rates, wherein the utilization of the first radio access resources indicates radio access resource to be used for transmission or reception of data to or from the user device;
transmitting the first association to at least one second network node; and
transmitting the first user data rates to the at least one second network node.

14. The method in accordance with claim 13, further comprising:
obtaining new channel quality information for the user device during the first validity time period;
computing updated first user data rates for the first radio access resources based on the new channel quality information; and
determining an updated utilization of the first radio access resources based on the first association and the updated first user data rates.

15. The method in accordance with claim 13, further comprising:
obtaining new load information;
obtaining measured user data rates during the first validity time period; and
determining an updated first association based on the new load information and the measured user data rates.

16. The method in accordance with claim 15, further comprising:
determining an updated first validity time period for the updated first association based on any of the obtained channel quality information and the measured user data rates.

17. A non-transitory computer readable medium, comprising processor-executable instructions which when executed by a processor, cause the processor to implement operations for a wireless communication system, the operations including:
obtaining channel quality information for a user device;
obtaining load information for first radio access resources;
determining a first association of the first radio access resources to the user device based on the channel quality information and the load information, the first association being valid during a first validity time period;
computing first user data rates for the first radio access resources based on the channel quality information;
determining a utilization of the first radio access resources based on the first association and the first user data rates, wherein the utilization of the first radio access resources indicates radio access resource to be used for transmission or reception of data to or from the user device;
transmitting the first association to at least one second network node; and
transmitting the first user data rates to the at least one second network node.

18. The non-transitory computer readable medium in accordance with claim 17, wherein the operations further include:
obtaining new channel quality information for the user device during the first validity time period;
computing updated first user data rates for the first radio access resources based on the new channel quality information; and
determining an updated utilization of the first radio access resources based on the first association and the updated first user data rates.

19. The non-transitory computer readable medium in accordance with claim 17, wherein the operations further include:
obtaining new load information;
obtaining measured user data rates during the first validity time period; and
determining an updated first association based on the new load information and the measured user data rates.

20. The non-transitory computer readable medium in accordance with claim 19, wherein the operations further include:
determining an updated first validity time period for the updated first association based on any of the obtained channel quality information and the measured user data rates.

* * * * *